United States Patent
Wang et al.

(10) Patent No.: US 10,568,453 B2
(45) Date of Patent: Feb. 25, 2020

(54) COFFEE BREWING DEVICE AND COFFEE CAPSULE MACHINE HAVING SAME

(71) Applicant: Elec-Tech International Co., Ltd., Zhuhai, Guangdong (CN)

(72) Inventors: Donglei Wang, Zhuhai (CN); Yunwei Shu, Zhuhai (CN)

(73) Assignee: ELEC-TECH INTERNATIONAL CO., LTD. (CN)

( * ) Notice: Subject to any disclaimer, the term of this patent is extended or adjusted under 35 U.S.C. 154(b) by 365 days.

(21) Appl. No.: 15/303,887

(22) PCT Filed: Sep. 22, 2015

(86) PCT No.: PCT/CN2015/090272
§ 371 (c)(1),
(2) Date: May 19, 2017

(87) PCT Pub. No.: WO2016/045576
PCT Pub. Date: Mar. 31, 2016

(65) Prior Publication Data
US 2017/0245676 A1 Aug. 31, 2017

(30) Foreign Application Priority Data
Sep. 23, 2014 (CN) .......................... 2014 1 0490631

(51) Int. Cl.
*A47J 31/36* (2006.01)
*A47J 31/40* (2006.01)

(52) U.S. Cl.
CPC ......... *A47J 31/407* (2013.01); *A47J 31/3633* (2013.01); *A47J 31/3638* (2013.01)

(58) Field of Classification Search
CPC . A47J 31/3638; A47J 31/3633; A47J 31/3623
(Continued)

(56) References Cited

U.S. PATENT DOCUMENTS

| 5,755,149 A | * | 5/1998 | Blanc | A47J 31/3623 99/289 T |
| 5,776,527 A | * | 7/1998 | Blanc | A47J 31/3633 426/77 |

(Continued)

FOREIGN PATENT DOCUMENTS

| CN | 101491415 | 7/2009 |
| CN | 201987327 | 9/2011 |

(Continued)

*Primary Examiner* — Reginald Alexander
(74) *Attorney, Agent, or Firm* — Colin P. Cahoon; Shaukat A. Karjeker; Carstens & Cahoon, LLP (57) ABSTRACT

Disclosed are a coffee brewing device and a coffee capsule machine having same. The coffee brewing device comprises: a brewing support (10); a capsule holder assembly (4) fixedly installed on the brewing support (10); a movable head assembly (1) installed on the brewing support (10); a driving device configured to drive the movable head assembly (1); and an automatic capsule-dropping mechanism comprising a capsule supporting plate (5), a transmission mechanism and an elastic reset component; wherein the capsule supporting plate (5) is rotatably installed at the bottom of the capsule holder assembly (4) via a rotating shaft (16), and has a supporting position and a non-supporting position; the transmission mechanism is arranged between the capsule supporting plate (5) and the movable head assembly (1), and is configured to drive the capsule supporting plate (5) to rotate from the supporting position to the non-supporting position when the movable head assembly (1) moves away from the capsule holder assembly (4); and the elastic reset component is configured to drive the capsule supporting plate (5) to rotate from the non-supporting position to the supporting position. The coffee brewing device can achieve an automatic capsule-dropping function, is convenient to operate, and has a high degree of safety.

13 Claims, 5 Drawing Sheets

(58) Field of Classification Search
USPC .................................... 99/289 R, 295, 302 R
See application file for complete search history.

(56) References Cited

U.S. PATENT DOCUMENTS

| | | | | |
|---|---|---|---|---|
| 5,974,949 A | * | 11/1999 | Weber | A47J 31/46 |
| | | | | 99/289 R |
| 2009/0007794 A1 | * | 1/2009 | Cortese | A47J 31/3628 |
| | | | | 99/289 R |

FOREIGN PATENT DOCUMENTS

| | | |
|---|---|---|
| CN | 201987328 | 9/2011 |
| CN | 203280250 | 11/2013 |
| CN | 204192367 | 3/2015 |
| EP | 1532904 | 5/2005 |
| WO | 2014132158 | 9/2014 |

\* cited by examiner

COFFEE BREWING DEVICE AND COFFEE CAPSULE MACHINE HAVING SAME

CROSS REFERENCE TO RELATED APPLICATIONS

The application is a continuation of application of PCT Patent Application No. PCT/CN2015/090272, entitled "Coffee Brewing Device and Coffee Capsule Machine Having Same", filed on Sep. 22, 2015, which claims priority to Chinese Patent Application No. 201410490631.6, filed on Sep. 23, 2014, entitled "coffee brewing device and coffee capsule machine having same", all of which are incorporated herein by reference.

TECHNICAL FIELD

The present disclosure relates to a beverage preparation device, more particularly, to a coffee brewing device and a coffee capsule machine having same.

BACKGROUND

Coffee capsules are produced by sealing the coffee powder, made by coffee beans subjected to special treatments, into capsules for the convenient use by consumers when brewing coffee, wherein nontoxic inert gas is filled in the capsules to prolong the shelf-life and for re-sterilization. When it is needed, coffee brewing can be done simply by putting a coffee capsule into a dedicated coffee capsule machine, without the need of grinding coffee beans or filling coffee powders.

For the existing coffee capsule machine for brewing coffee, the used capsule has to be taken out of the brewing cavity by hand, the machine is inconvenient to operate and has low safety.

SUMMARY

In view of the defects existing in the prior art mentioned above, an objective of the present disclosure is to provide a coffee brewing device which is convenient to operate and has high safety, and to provide a coffee capsule machine having same.

In order to solve the technical problem above, the present disclosure provides a coffee brewing device, comprising:

a brewing support;

a capsule holder assembly fixedly installed on said brewing support;

a movable head assembly, said movable head assembly is installed on said brewing support, and is capable of moving to-and-fro relative to said capsule holder assembly, a brewing cavity is formed between said movable head assembly and said capsule holder assembly;

a driving device configured to drive said movable head assembly; and an automatic capsule-dropping mechanism, said automatic capsule-dropping mechanism comprises a capsule supporting plate, a transmission mechanism and an elastic reset component; wherein, said capsule supporting plate is rotatably installed at a bottom of said capsule holder assembly via a rotating shaft, and said capsule supporting plate has a supporting position for holding a bottom of a raw-material capsule and a non-supporting position for leaving the bottom of said raw-material capsule hanging freely; said transmission mechanism is arranged between said capsule supporting plate and said movable head assembly, and is configured to drive said capsule supporting plate to rotate from said supporting position to said non-supporting position when said movable head assembly moves away from said capsule holder assembly; said elastic reset component is configured to drive said capsule supporting plate to rotate from said non-supporting position to said supporting position.

In one of the embodiments, an angle between said supporting position and said non-supporting position is ranged from 90° to 120°.

In one of the embodiments, said transmission mechanism comprises:

a ratchet, said ratchet is installed on said rotating shaft, and is configured to rotate with said capsule supporting plate synchronously, said ratchet has a plurality of first teeth at its outer circumference; and a rack, said rack is installed on said movable head assembly, and is driven by said movable head assembly to move to-and-fro, said rack has a plurality of second teeth engageable with the plurality of first teeth; when said movable head assembly moves away from said capsule holder assembly, said second teeth and said first teeth get engaged and said ratchet is driven to rotate; when said movable head assembly moves towards said capsule holder assembly, said second teeth slides over said first teeth and said ratchet stops rotating.

In one of the embodiments, said rack has a tooth segment approximate to said capsule holder assembly, and a non-tooth segment approximate to said movable head assembly, said second teeth are disposed on said tooth segment.

In one of the embodiments, a sliding groove is disposed on said rack along the moving direction thereof, and said rack is installed on said movable head assembly via a pin passing through said sliding groove.

In one of the embodiments, there are two ratchets and two racks, the two ratchets are located at two sides of said capsule supporting plate respectively, the two racks are located at two sides of said movable head assembly respectively.

In one of the embodiments, said capsule supporting plate is rigidly connected to said rotating shaft via a connector.

In one of the embodiments, said elastic reset component is a torsion spring, said torsion spring is sleeved on said shaft, one end of said torsion spring is fixed on said capsule supporting plate, another end of said torsion spring is fixed on said capsule holder assembly.

In one of the embodiments, slots extending along a direction vertical to the moving direction of said movable head assembly are disposed on both of opposed side walls of said brewing cavity respectively, a flange disposed at one end of said raw-material capsule approximate to said capsule holder assembly is inserted in said slots, and is slidable in the corresponding slots.

The present disclosure further provides a coffee capsule machine, which comprises said coffee brewing device as set forth.

As compared with the prior art, since an automatic capsule-dropping mechanism is provided in the coffee brewing device and coffee capsule machine having same of the present disclosure, after the capsule coffee brewing has been completed, the movable head assembly moves away from the capsule holder assembly, and thus the capsule supporting plate is driven to rotate from the supporting position to the non-supporting position, thereby the raw-material capsule can automatically fall down by the gravity. The present invention is convenient to operate and has high safety.

The beneficial effects of additional technical features of the present disclosure will be described in the Detailed Description of the Preferred Embodiments.

The elements in the figures are denoted as follows: 1. movable head assembly; 2. raw-material capsule; 21. flange; 3. brewing cavity; 4. capsule holder assembly; 5. capsule supporting plate; 6. torsion spring; 7. ratchet; 71. first teeth; 8. rack; 81. tooth segment; 82. non-tooth segment; 83. sliding groove; 84. second teeth; 9. pin; 10. brewing support; 11. driving device; 14. locking pin; 15. connector; 16. rotating shaft; 17. slot.

DETAILED DESCRIPTION OF THE PREFERRED EMBODIMENTS

The present disclosure will be described in more details with reference to the accompanying figures and embodiments. It should be noted that various embodiments and the features thereof can be combined with each other under the condition of no conflict.

Figure 1:
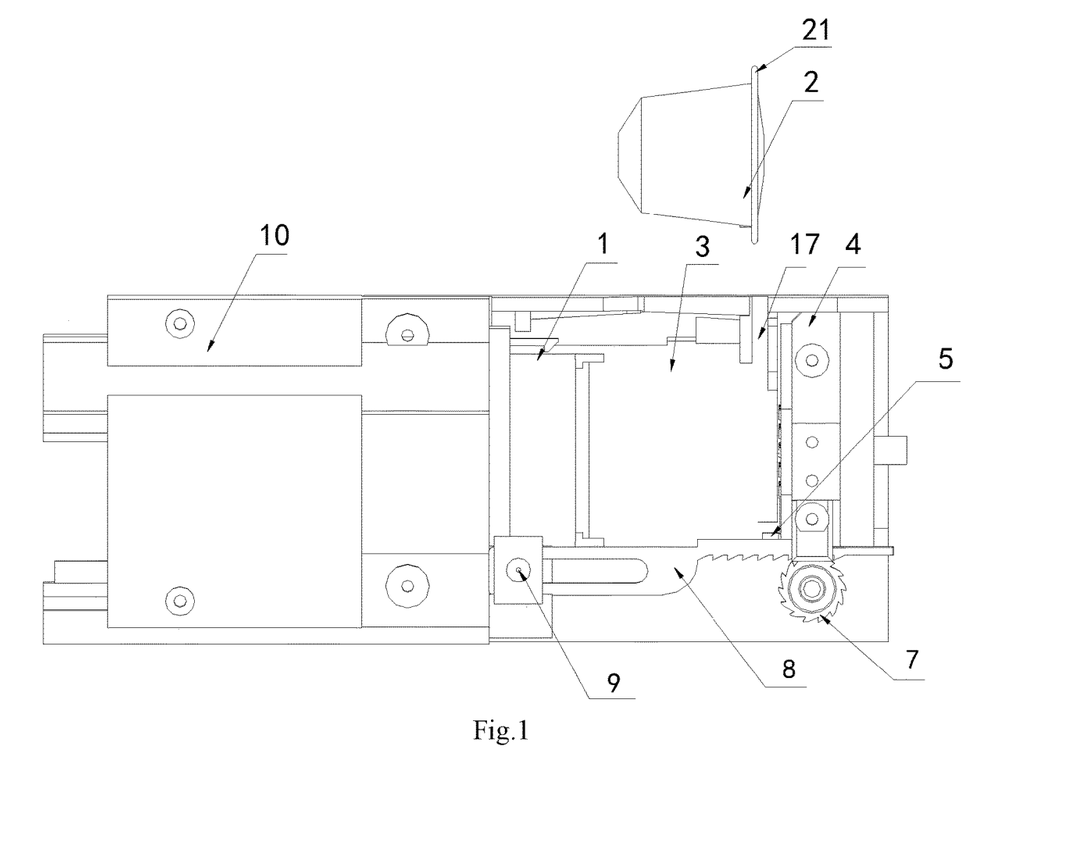
FIG. 1 is a schematic view illustrating the structure of the coffee brewing device according to one embodiment of the present invention.

As shown in FIG. 1, a coffee brewing device in one embodiment of the present invention includes a brewing support 10, a capsule holder assembly 4, a movable head assembly 1, a driving device and an automatic capsule-dropping mechanism; wherein, the capsule holder assembly 4 is fixedly installed on the brewing support 10; the movable head assembly 1 is installed on the brewing support 10, and is able to move to-and-fro relative to the capsule holder assembly 4, a brewing cavity 3 is formed between the movable head assembly 1 and the capsule holder assembly 4; slots 17 extending along the direction vertical to the moving direction of the movable head assembly 1 are disposed on both of the opposed side walls of the brewing cavity 3 respectively. When the coffee brewing device is in operation, a raw-material capsule 2 is put into the brewing cavity 3, a flange 21 disposed at one end of the raw-material capsule 2 proximal to the capsule holder assembly 4 is inserted in the slots 17 and can slide in the corresponding slots 17; the driving device is configured to drive the movable head assembly 1; preferably, the driving device is a hydraulic driving device.

Figure 2:
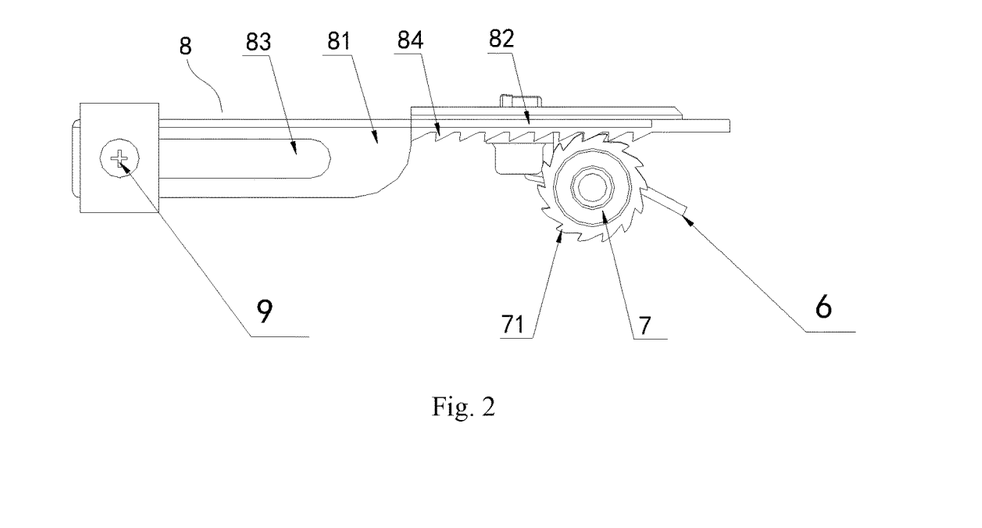
FIG. 2 is a schematic side view of the automatic capsule-dropping mechanism of the coffee brewing device shown in FIG. 1.
Figure 3:
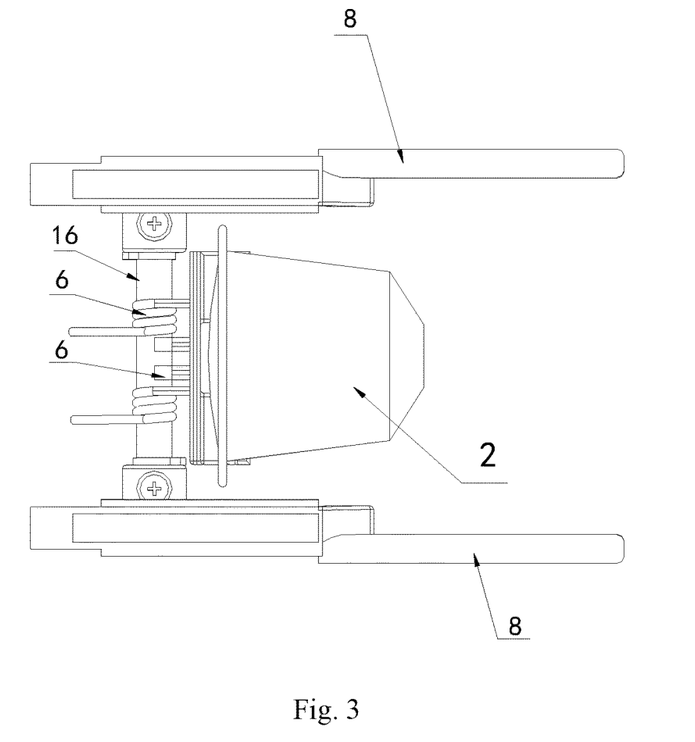
FIG. 3 is a schematic top view of the automatic capsule-dropping mechanism of the coffee brewing device shown in FIG. 1.
Figure 4:
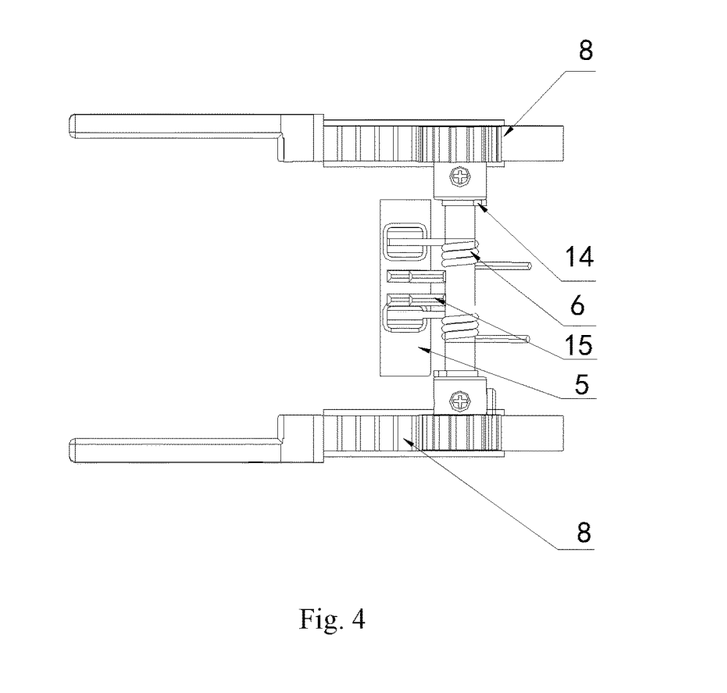
FIG. 4 is a schematic bottom view of the automatic capsule-dropping mechanism of the coffee brewing device shown in FIG. 1.

As shown in FIG. 2 to FIG. 4, the automatic capsule-dropping mechanism includes a capsule supporting plate 5, a transmission mechanism and an elastic reset component. The capsule supporting plate 5 is rotatably installed at the bottom of the capsule holder assembly 4 via a rotating shaft 16, and the capsule supporting plate 5 has a supporting position for holding the bottom of the raw-material capsule 2 and a non-supporting position for leaving the bottom of the raw-material capsule 2 hanging freely. The transmission mechanism is arranged between the capsule supporting plate 5 and the movable head assembly 1, and is configured to drive the capsule supporting plate 5 to rotate from the supporting position to the non-supporting position when the movable head assembly 1 moves away from the capsule holder assembly 4; and then, after the capsule coffee brewing has been completed, the movable head assembly moves away from the capsule holder assembly, and the capsule supporting plate is driven to rotate from the supporting position to the non-supporting position, the raw-material capsule automatically falls down due to the gravity. The coffee brewing device is convenient to operate and has high safety. The elastic reset component is configured to drive the capsule supporting plate 5 to rotate from the non-supporting position to the supporting position. Preferably, the angle between the supporting position and the non-supporting position is 90°~120°.

In this embodiment, the transmission mechanism includes two ratchets 7 and two racks 8. The two ratchets 7 are installed on the two ends of the rotating shaft 16 respectively, the ratchets 7 are installed on the rotating shaft 16, and are configured to rotate with the capsule supporting plate 5 synchronously, each of the ratchets 7 has a plurality of first teeth 71 at its outer circumference. The two racks 8 are located at the two sides of the movable head assembly 1 respectively, the racks 8 are installed on the movable head assembly 1, and is driven by the movable head assembly 1 to move to-and-fro, each of the racks 8 has a plurality of second teeth 84 engageable with the plurality of first teeth 71. When the movable head assembly 1 moves away from the capsule holder assembly 4, the second teeth 84 gets engaged with the first teeth 71, and the ratchets 7 are driven to rotate; when the movable head assembly 1 moves towards the capsule holder assembly 4, the second teeth 84 slides over the first teeth 71 and the ratchets 7 stop rotating.

Preferably, the rack 8 has a tooth segment 81 approximate to the capsule holder assembly 4 and a non-tooth segment 82 approximate to the movable head assembly 1, and the plurality of the second teeth 84 are disposed on the tooth segment 81. Therefore, when the displacement of the movable head assembly 1 from the capsule holder assembly 4 is less or equal to the length of the tooth segment 81, the movable head assembly 1 drives the racks 8 to move, and thus the ratchet 7 and the capsule supporting plate 5 are driven to rotate; when the displacement of the movable head assembly 1 from the capsule holder assembly 4 is larger than the length of the tooth segment 81, the racks 8 are disengaged from the ratchets 7, and the capsule supporting plate moves back to the supporting position by the action of the elastic reset component.

Preferably, a sliding groove 83 is provided on the rack 8 along the moving direction thereof, and the rack 8 is installed on the movable head assembly 1 via a pin 9 passing through the sliding groove 83. Therefore, when the movable head assembly 1 moves towards the capsule holder assembly 4, firstly, the pin 9 slides through the sliding groove 83, the racks 8 are still; only when the pin 9 has reached the rear end of the sliding groove 83, the movable head assembly 1 will drive the racks 8 to move. In the same way, when the movable head assembly 1 moves away from the capsule holder assembly 4, firstly, the pin 9 slides through the sliding groove 83, the racks 8 are still; only when the pin 9 has reached the front end of the sliding groove 83, the movable head assembly 1 will drive the racks 8 to move, so that the racks 8 will drive the ratchets 7 to rotate only when the coffee brewing has been completed.

Preferably, the capsule supporting plate 5 is rigidly connected to the rotating shaft 16 via a connector 15. The elastic reset component may be a torsion spring 6, the torsion spring 6 is sleeved on the rotating shaft 16, and one end of the torsion spring 6 is fixed on the capsule supporting plate 5, and the other end is fixed on the capsule holder assembly 4.

As shown in FIG. 5 to FIG. 9, the coffee brewing device of this embodiment works as follows:

1. Initially, the movable head assembly 1 is at the reset state, the capsule supporting plate 5 is at the supporting position, that is, the horizontal position.

Figure 5:
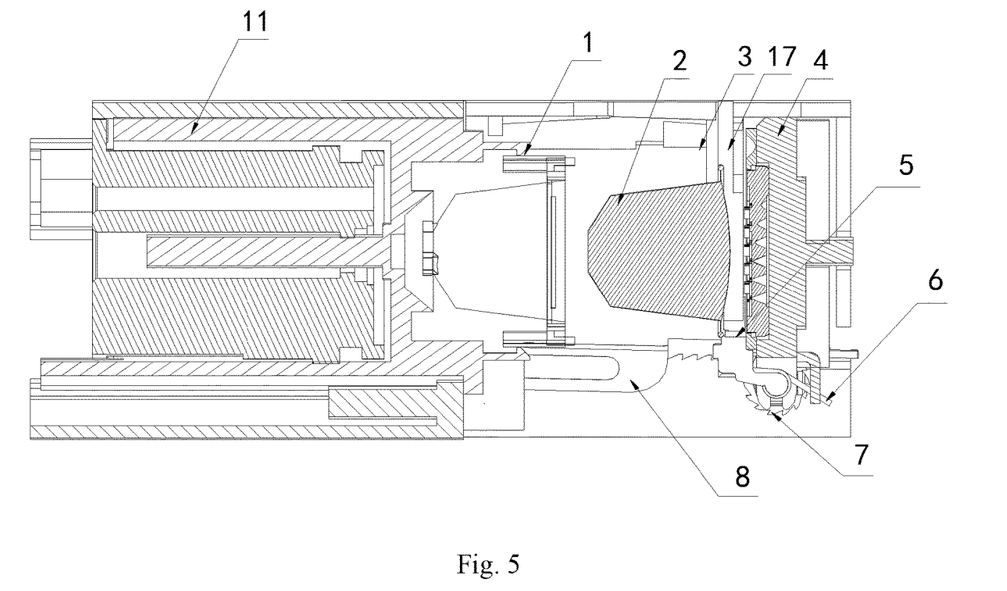
FIG. 5 is a schematic cross-section view illustrating the initial state of the coffee brewing device shown in FIG. 1 when a raw-material capsule is put into the brewing cavity.

2. The raw-material capsule is put into the brewing cavity of the coffee brewing device along the slots 17 on the capsule holder assembly 4, and the raw-material capsule is supported by the capsule supporting plate 5 in the brewing cavity 3 (as shown in FIG. 5).

Figure 6:
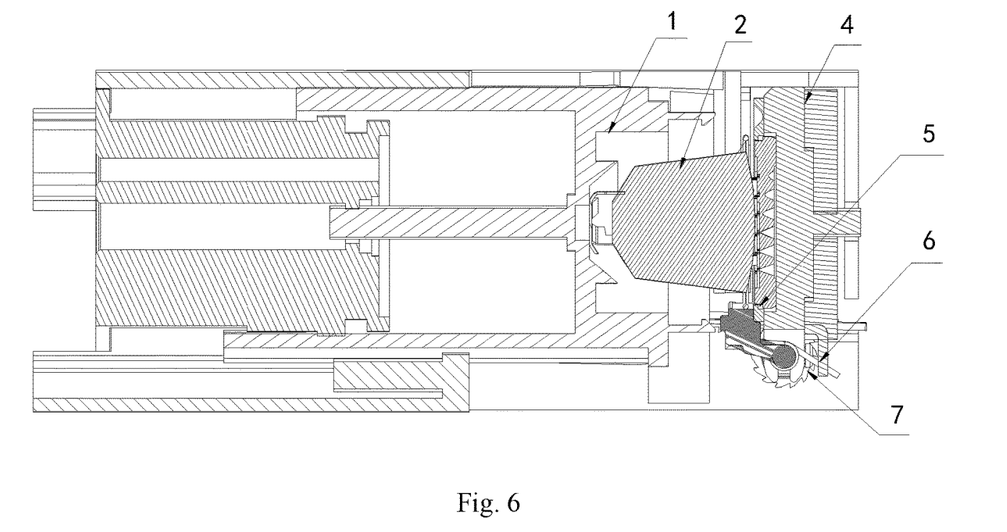
FIG. 6 is a schematic cross-section view illustrating the brewing state of the coffee brewing device shown in FIG. 1.

3. Driven by the driving device 11, the movable head assembly 1 drives the racks 8 to move towards the capsule holder assembly 4, and at this time, the bottom of the raw-material capsule 2 is supported by the capsule supporting plate 5 (as shown in FIG. 6).

Figure 7:
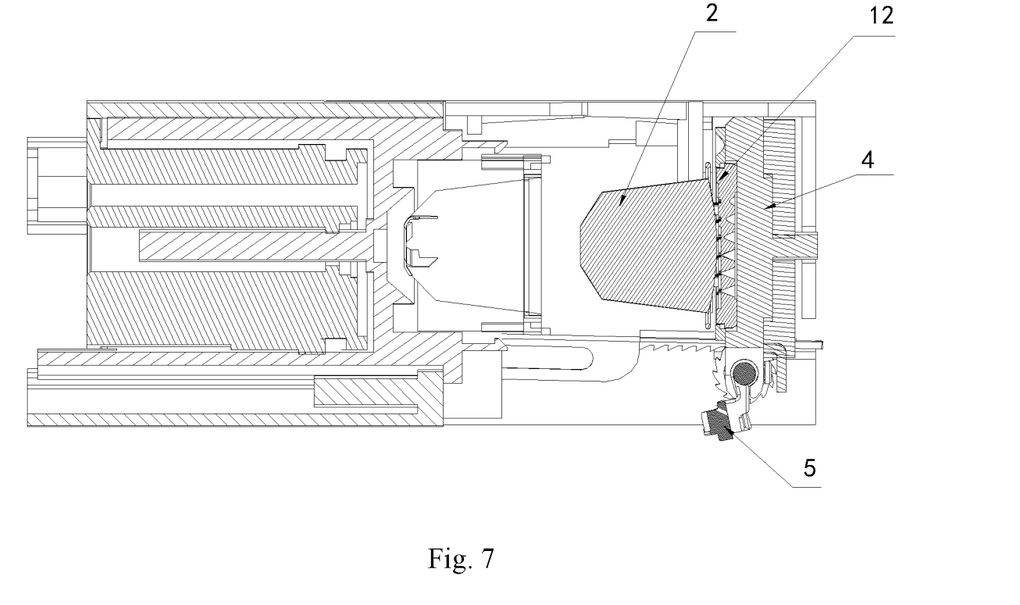
FIG. 7 is a schematic cross-section view illustrating the brewed state of the coffee brewing device shown in FIG. 1 when the movable head assembly is moving back.

4. When the movable head assembly 1 drives the racks 8 to move into the capsule holder assembly 4, the capsule supporting plate 5 rotates about the rotating shaft 16 by the ratchets 7, until the capsule supporting plate rotates to a vertical position; during this process, the bottom of the raw-material capsule 2 is supported by the capsule supporting plate 5. When the movable head assembly 1 drives the racks 8 to completely enter the capsule holder assembly 4, the movable head assembly 1 continues moving towards the capsule holder assembly 4 until the raw-material capsule 2 is spiked and pressed completely (as shown in FIG. 7).

Figure 8:
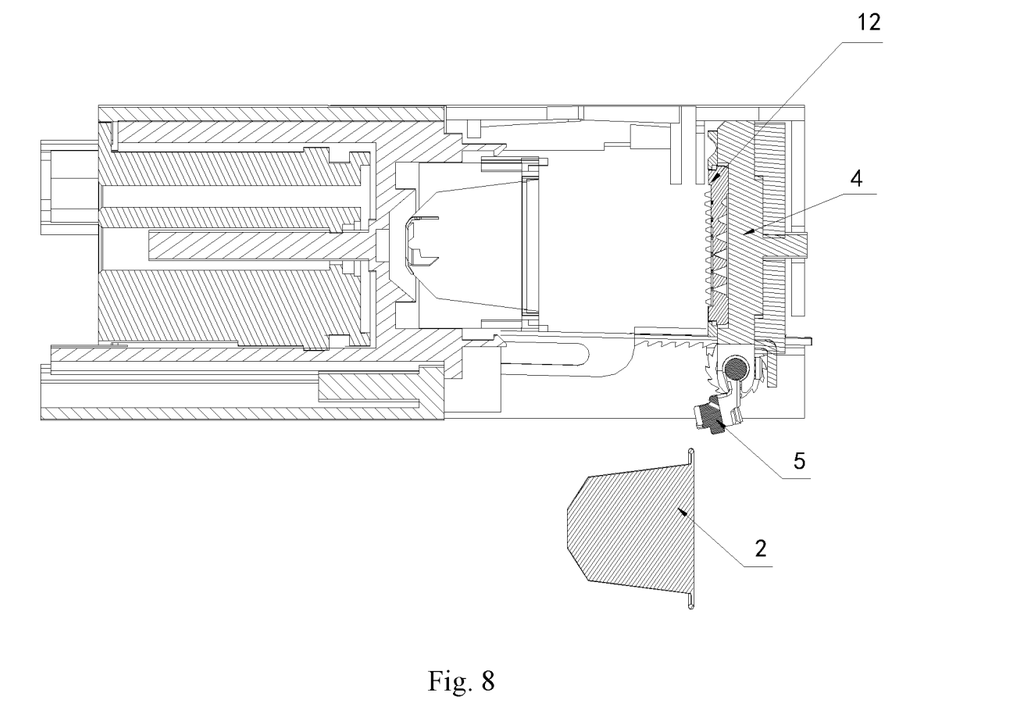
FIG. 8 is a schematic cross-section view illustrating the brewed state of the coffee brewing device shown in FIG. 1 when the raw-material capsule is being dropped off.

5. After the coffee brewing has been completed, the movable head assembly 1 is driven by the driving device 1 to reset, and drives the racks 8. The bottom of the raw-material capsule 2 is still supported by the capsule supporting plate 5, until the movable head assembly 1 drives the raw-material capsule 2 to be completely disengaged from the capsule holder assembly 4. At this moment, the capsule supporting plate 5 is in the vertical position, hence, the bottom of raw-material capsule 2 is not supported, then the raw-material capsule 2 falls down from the brewing cavity due to the gravity, thereby the automatic capsule-dropping function can be achieved (as shown in FIG. 8).

Figure 9:
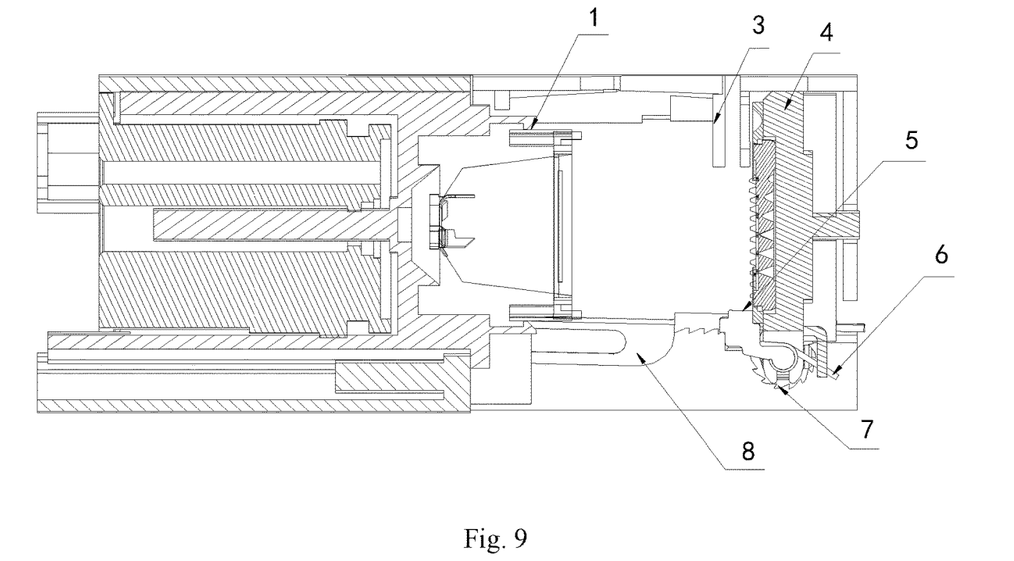
FIG. 9 is a schematic cross-section view illustrating the coffee brewing device shown in FIG. 1 when the device returns to its initial state after the coffee brewing has been completed.

6. When the movable head assembly 1 moves back to the initial position, the capsule supporting plate 5 can be automatically reset by the action of the torsion spring (as shown in FIG. 9).

In conclusion, as the coffee brewing device of the embodiments of the present invention adopts the above technical solutions, the used capsule can be dropped automatically, and the device is convenient to operate and has a high safety.

The present disclosure further provides a coffee capsule machine, comprising the coffee brewing device as set forth in the above embodiments.

What described above are only some embodiments of the present invention, which is more specific and detailed, but not intended to limit the scope of the present disclosure. It should be noted that, to those of ordinary skill in the art, modifications and improvements can be made without departing from the spirit of the present invention, and all of these shall be included within the protection scope of the present invention.

What is claimed is:

1. A coffee brewing device, comprising:
   a brewing support (10);
   a capsule holder assembly (4) fixedly installed on said brewing support (10);
   a movable head assembly (1), said movable head assembly (1) is installed on said brewing support (10), and is capable of moving to-and-fro relative to said capsule holder assembly(4), a brewing cavity (3) is formed between said movable head assembly (1) and said capsule holder assembly (4);
   a driving device configured to drive said movable head assembly (1); and
   an automatic capsule-dropping mechanism, said automatic capsule-dropping mechanism comprising: a capsule supporting plate (5), a transmission mechanism and an elastic reset component; wherein, said capsule supporting plate (5) is rotatably installed at the bottom of said capsule holder assembly (4) via a rotating shaft (16), and said capsule supporting plate (5) has a supporting position for holding a bottom of a raw-material capsule (2) and a non-supporting position for leaving the bottom of said raw-material capsule (2) hanging freely; said transmission mechanism is arranged between said capsule supporting plate (5) and said movable head assembly (1), and is configured to drive said capsule supporting plate (5) to rotate from said supporting position to said non-supporting position when said movable head assembly (1) moves away from said capsule holder assembly(4); and said elastic reset component is configured to drive said capsule supporting plate (5) to rotate from said non-supporting position to said supporting position;
   wherein, said transmission mechanism comprises:
   a ratchet (7), said ratchet (7) is installed on said rotating shaft (16), and is configured to rotate with said capsule supporting plate (5) synchronously, said ratchet (7) has a plurality of first teeth (71) at its outer circumference; and
   a rack (8), said rack (8) is installed on said movable head assembly (1), and is driven by said movable head assembly (1) to move to-and-fro, said rack (8) has a plurality of second teeth (84) engageable with the plurality of first teeth (71); when said movable head assembly (1) moves away from said capsule holder assembly(4), said second teeth (84) gets engaged with said first teeth (71), and said ratchet (7) is driven to rotate; when said movable head assembly (1) moves towards said capsule holder assembly (4), the second teeth (84) slides over said first teeth (71) and said ratchet (7) stops rotating.

2. The coffee brewing device according to claim 1, wherein, an angle between said supporting position and said non-supporting position is ranged from 90° to 120°.

3. The coffee brewing device according to claim 1, wherein, said rack (8) has a tooth segment (81) approximate to said capsule holder assembly (4) and a non-tooth segment (82) approximate to said movable head assembly (1), said second teeth (84) are disposed on said tooth segment (81).

4. The coffee brewing device according to claim 1, wherein, a sliding groove (83) is disposed on said rack (8) along the moving direction thereof, and said rack (8) is installed on said movable head assembly (1) via a pin (9) passing through said sliding groove (83).

5. The coffee brewing device according to claim 1, wherein, there are two ratchets (7) and two racks (8), the two ratchets (7) are located at two sides of said capsule supporting plate (5) respectively, the two racks (8) are located at two sides of said movable head assembly (1) respectively.

6. The coffee brewing device according to claim 1, wherein, said capsule supporting plate (5) is rigidly connected to said rotating shaft (16) via a connector (15).

7. The coffee brewing device according to claim 6, wherein, said elastic reset component is a torsion spring (6) sleeved on said rotating shaft (16), and one end of said torsion spring (6) is fixed on said capsule supporting plate (5), another end is fixed on said capsule holder assembly (4).

8. The coffee brewing device according to claim 1, wherein, slots (17) extending along a direction vertical to the moving direction of said movable head assembly (1) are disposed on both of opposed side walls of said brewing cavity (3) respectively, a flange (21) disposed at one end of said raw-material capsule (2) approximate to said capsule holder assembly (4) is inserted in said slots (17), and is slidable in the corresponding slots (17).

9. A coffee capsule machine, comprising the coffee brewing device as defined in claim 1.

10. A coffee capsule machine, comprising the coffee brewing device as defined in claim 2.

11. A coffee capsule machine, comprising the coffee brewing device as defined in claim 3.

12. A coffee capsule machine, comprising the coffee brewing device as defined in claim 4.

13. A coffee capsule machine, comprising the coffee brewing device as defined in claim 5.

* * * * *